United States Patent [19]

Robson

[11] Patent Number: 5,511,160

[45] Date of Patent: Apr. 23, 1996

[54] INFORMATION RETRIEVAL DEVICE FOR DISPLAYING AND DIRECTLY REFRESHING THE DISPLAY OF A DOCUMENT

[75] Inventor: Christopher J. Robson, Corvallis, Oreg.

[73] Assignee: Hewlett-Packard Company, Palo Alto, Calif.

[21] Appl. No.: 130,076

[22] Filed: Sep. 30, 1993

[51] Int. Cl.$^6$ ................................................ G06F 15/00
[52] U.S. Cl. ...................................................... 395/162
[58] Field of Search ................................... 395/162–166, 395/425, 600

[56] References Cited

U.S. PATENT DOCUMENTS

| | | | |
|---|---|---|---|
| 5,159,669 | 10/1992 | Trigg et al. | 395/159 |
| 5,268,963 | 12/1993 | Monroe et al. | 380/23 |
| 5,297,249 | 3/1994 | Bernstein et al. | 395/156 |
| 5,325,483 | 6/1994 | Ise et al. | 395/162 |
| 5,333,237 | 7/1994 | Stefanopoulos | 395/12 |
| 5,355,472 | 10/1994 | Lewis | 395/600 |
| 5,392,447 | 2/1995 | Schlack et al. | 395/800 |

Primary Examiner—Mark R. Powell
Assistant Examiner—U Chauhan
Attorney, Agent, or Firm—Curtis G. Rose

[57] ABSTRACT

An information retrieval device displays portions of a document requested by a user. The information retrieval device has a controller connected to a display screen, input selector switches, such as buttons, and non-volatile memory, such as a removable ROM. One or more documents, such as a book or magazine, is stored in the non-volatile memory. When the device is turned on, a first portion of a document is displayed on a display screen. When the user wants to see a different portion of the document, or a different document altogether, she presses one of the buttons. Upon detection that a button was enabled, an action is performed that changes the display on the display screen. The action performs can vary in complexity: it may simply cause the next page of the document to be displayed, or may execute a nested hypertext link to cause related information contained in the same or a different document to update only a portion of the display screen. The document is stored on the non-volatile memory in a manner that allows the display screen to be refreshed directly from the non-volatile memory.

17 Claims, 11 Drawing Sheets

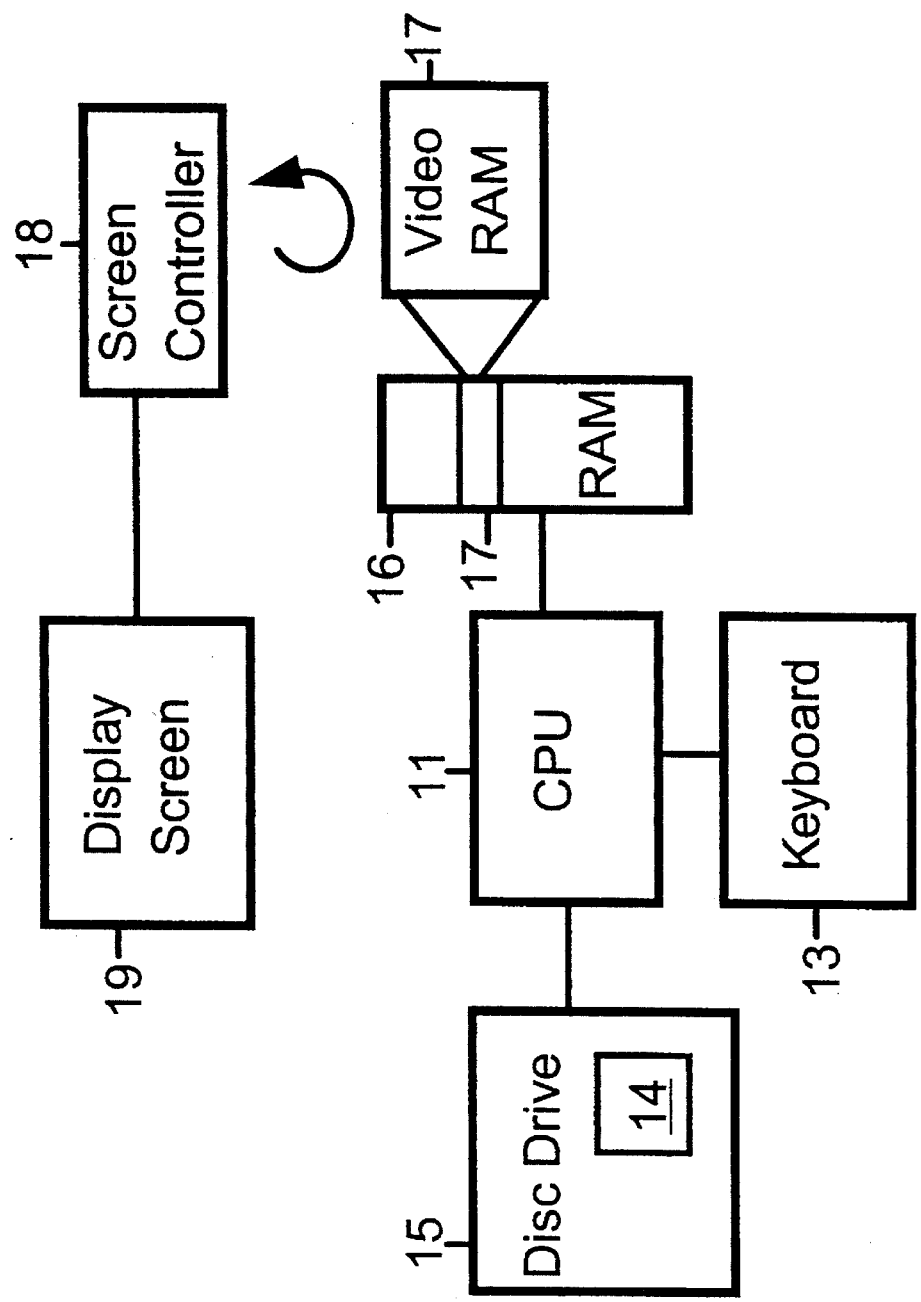

Simple Hypertext Model 80

INFORMATION RETRIEVAL DEVICE FOR DISPLAYING AND DIRECTLY REFRESHING THE DISPLAY OF A DOCUMENT

REFERENCE TO RELATED APPLICATIONS

This invention is related to commonly assigned patent application Ser. No. 08/130,075 U.S. Pat. No. 5,491,785. "Information Retrieval Device for Displaying a Dynamically Modifiable Document", filed on even date herewith, herein incorporated by reference.

1. Field of the Invention

This invention relates to the data processing field. More particularly, this invention is an information retrieval device specifically designed for displaying one or more documents in an efficient, cost effective manner.

2. Background of the Invention

General purpose personal computers have certainly had a revolutionary effect on the modern world. Only a few short years ago, it was inconceivable that only a few thousand dollars could buy an incredibly powerful machine capable of performing almost any imaginable task performed in the workplace or home. In a single day, the same general purpose personal computer could be instructed to calculate a complex mathematical equation, compose a letter to a friend, do a regression cost analysis on a spreadsheet, send a electronic mail message to the President of the United States, and instruct your toaster to make you a piece of toast.

While the general purpose computer is capable of doing just about everything, it has often been criticized for not doing anything particularly well. Many people clearly do not want to pay substantial sums of their hard earned money for a general purpose computer that does thousands of things they don't want to do, but doesn't do a good job at what they do want to do. This is particularly true in the area of information retrieval, where many people would love to have a well designed, cost effective electronic alternative to hard copy media such as books and magazines, but don't want to pay thousands of dollars for a general purpose computer that does, at best, a mediocre job of performing this task.

SUMMARY OF THE INVENTION

It is the primary object of the invention to provide an information retrieval device capable of displaying a document.

It is another object of the invention to provide an information retrieval device capable of displaying a document in a cost effective manner.

It is another object of the invention to provide an information retrieval device capable of displaying a hypertext document.

These and other objects are accomplished by the information retrieval device for displaying a document disclosed herein.

An information retrieval device displays portions of a document requested by a user. The information retrieval device has a controller connected to a display screen, input selector switches, such as buttons, and non-volatile memory, such as a removable ROM. One or more documents, such as a book or magazine, is stored in the non-volatile memory. When the device is turned on, a first portion of a document is displayed on a display screen. When the user wants to see a different portion of the document, or a different document altogether, she presses one of the buttons. Upon detection that a button was enabled, an action is performed that changes the display on the display screen. The action performed can vary in complexity: it may simply cause the next page of the document to be displayed, or may execute a nested hypertext link to cause related information contained in the same or a different document to update only a portion of the display screen. The document is stored in the non-volatile memory in a manner that allows the display screen to be refreshed directly from the non-volatile memory.

BRIEF DESCRIPTION OF THE DRAWINGS

FIG. 1 shows a block diagram of a conventional general purpose computer system.

DETAILED DESCRIPTION OF THE PREFERRED EMBODIMENT

Figure 2A:
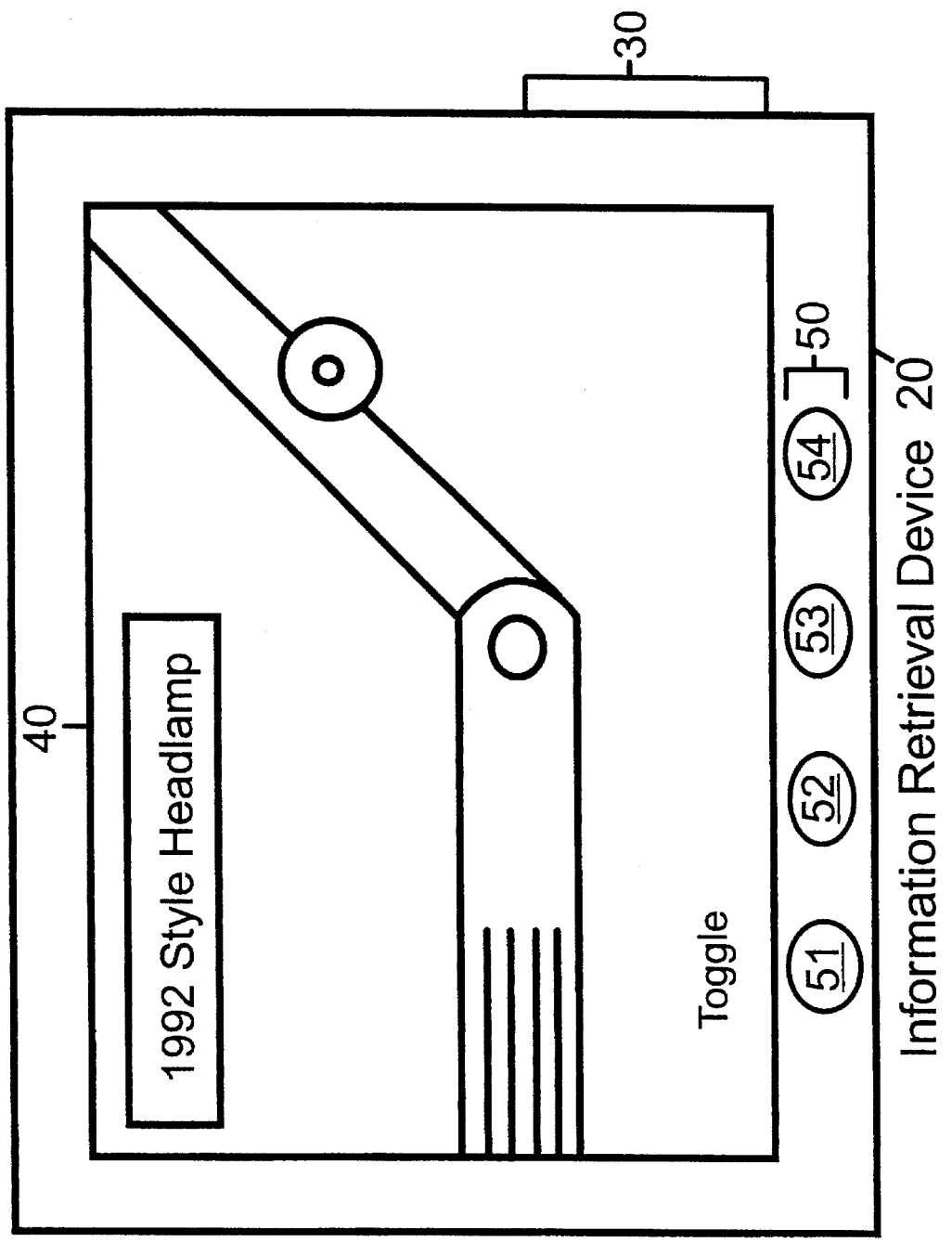
FIG. 2A shows the information retrieval device of the invention.

FIG. 1 shows a block diagram of a conventional general purpose computer system. Processor 11 is capable of being programmed to perform a wide variety of tasks. Under user direction from keyboard 13, processor 11 retrieves application program 14 from disk drive 15. Application program 14 instructs processor 11 to perform specific tasks unique to the function of application program 14. Whenever application program 14 instructs processor 11 to display an image on display screen 19, processor 11 collects data from various locations on disk drive 15 and/or random access memory 16 and generates an image for display. This process is known as "rendering". After processor 15 has rendered the image for display on display screen 19, it places the rendered image in a special segment of RAM 16 known as video RAM 17. Screen Controller 18 scans the rendered image in video RAM 17 at a rate of between 50–70 Hz, and uses this information to keep display screen 19 refreshed at a rate that appears constant to the human eye. When computer system 10 is turned off, the contents of video RAM 17 are erased.

FIG. 2A shows information retrieval device 20 of the invention. Device 20 has non-volatile memory 30, display screen 40, and input selector switches 50. In the preferred embodiment, memory 30 is a removable card containing read only memory, or ROM. Memory 30 could also be one or more ROM or EPROM chips hardwired into device 20, or plugged into and removable from device 20, and still fall within the spirit and scope of the invention. In addition, memory 30 could be flash memory or non-volatile RAM contained on or plugged into device 20. If flash memory is used, it could be removed from device 20 and plugged into a general purpose computer, such as in an industry standard PCMCIA slot, for updating or changing the document contained in memory 30. For purposes of this invention, the term "non-volatile" shall mean any form of memory that remains substantially intact after device 20 is turned off.

Input selector switches 50 are shown as a series of buttons 51–54 below display screen 40. While four buttons are shown, input selector switches 50 could refer to anything from a mouse (with one to several buttons and one to several operating modes—such as single click, double click, drag and drop, etc) to dozens or hundreds of buttons. In addition, input selector switches 50 could physically reside on display screen 40, capable of being enabled by touch, stylus, light pen, tab key, etc. Input selector switches 50 could also be connected to sensors capable of sensing external events such as position, light, heat, temperature, motion, etc.

Figure 2B:
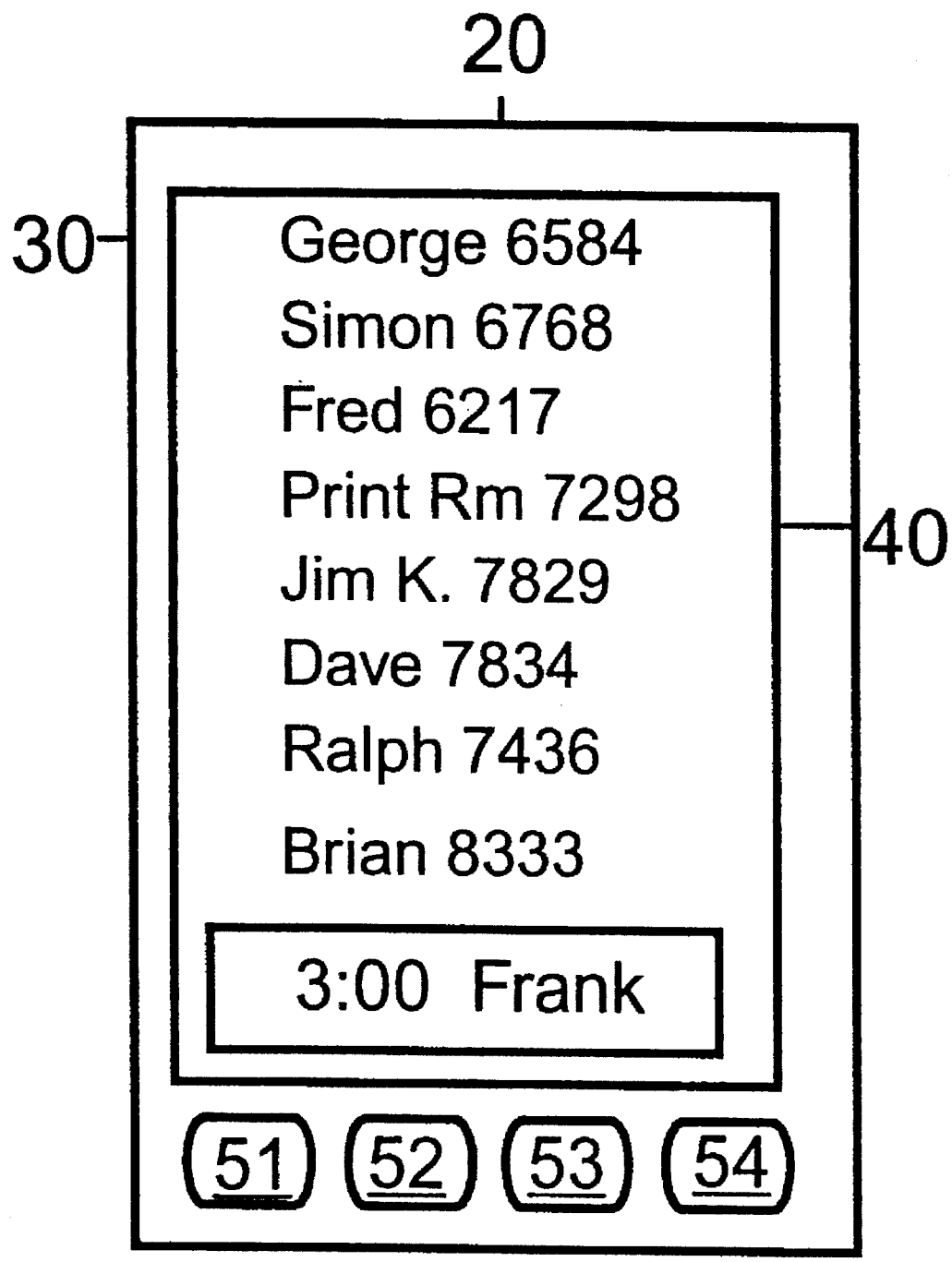
FIG. 2B shows the information retrieval device of an alternate embodiment of the invention.

FIG. 2B shows an alternate embodiment of the invention, where device 20 itself is the size of a flash memory card pluggable into a PCMCIA slot. Memory 30 is flash memory integrally connected to device 20. Note that the display screen of FIG. 2B is much smaller than the display screen of FIG. 2A, and input selector switches 50 are contained on a membrane keyboard. When it is desirable to update memory 30, the entire device of FIG. 2B is inserted into a PCMCIA slot in a general purpose computer.

Figure 3:
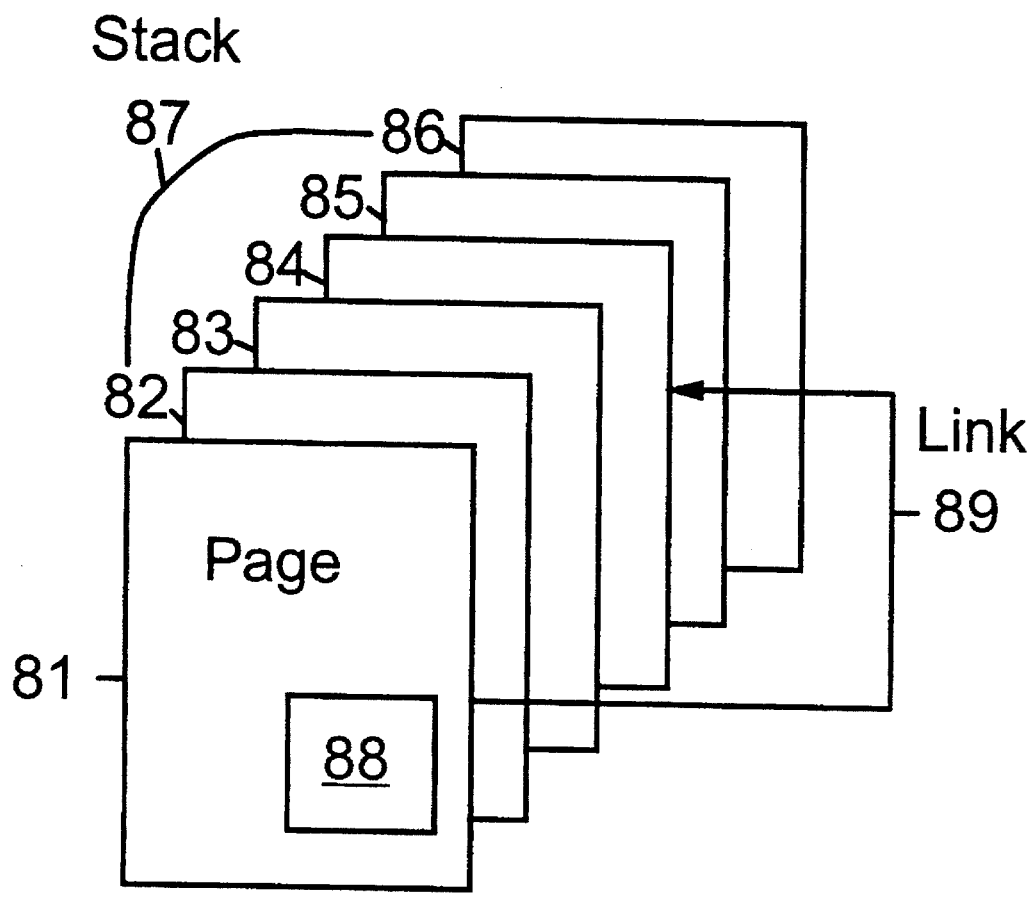
FIG. 3 shows a hypertext model.

Before information retrieval device 20 is discussed in more detail, it will be useful to briefly discuss the general concept and terminology involved with hypertext. FIG. 3 shows simple hypertext model 80. In hypertext model 80, information is displayed to a user one page at a time. Model 80 contains a series of pages 81–86, arranged in stack 87. Assume the data on page 81 is being displayed to a user. Page 81 contains link cell 88, which is typically an icon, word or phrase having a different appearance from the other words or phrases on page 81. If the user selects link cell 88 (most commonly by moving the mouse cursor over to the link cell and double clicking), link 89 is executed, and page 84 is now displayed to the user.

Figure 4:
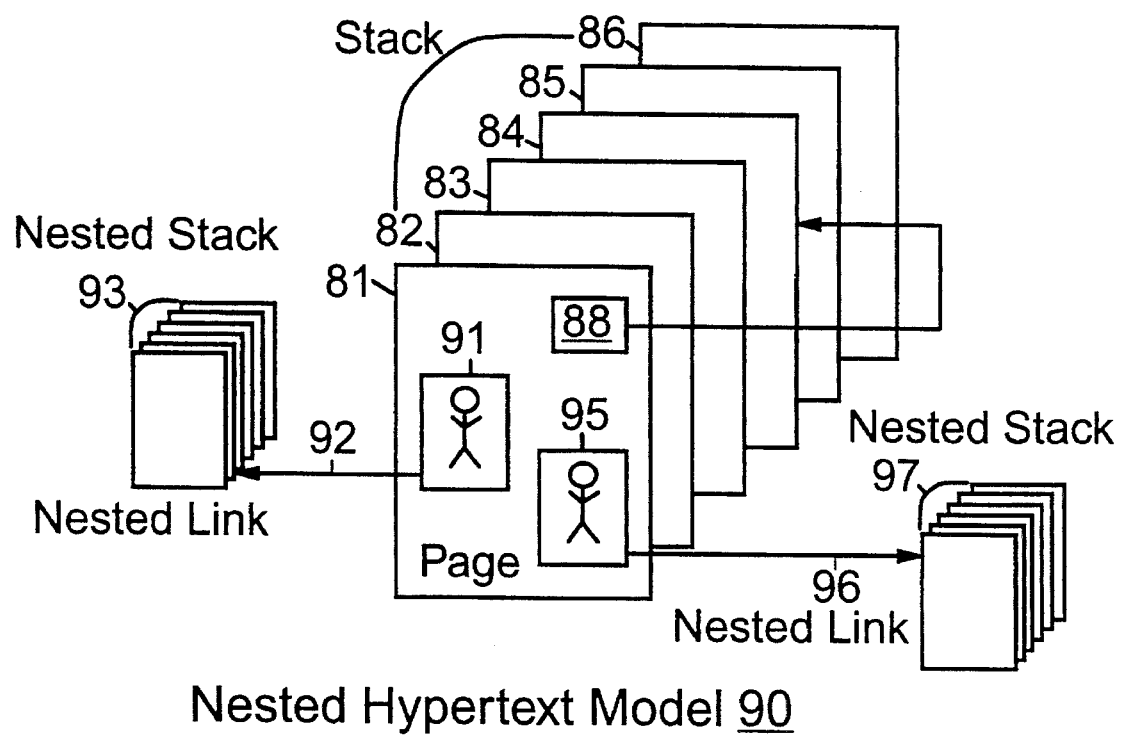
FIG. 4 shows a nested hypertext model.

FIG. 4 shows nested hypertext model 90. Model 90 is similar to model 80, but allows for the pages in the hypertext stack to be nested. As before, model 90 contains pages 81–86 arranged in stack 87. But page 81 contains image 91 and image 95. Image 91 is connected by nested link 92 to nested stack 93. Likewise, image 95 is connected by nested link 96 to nested stack 97. Therefore, image 91 can be any of the images stored on the pages in stack 93, and image 95 can be any of the images stored on the pages in stack 97. Nested hypertext, while more complex than simple hypertext, allows for a dramatic increase in function and power of the use of hypertext in information retrieval. Stacks 87, 93 and 97 can each be considered objects in the classical computer sense, as each stack are self contained state machines reacting to external events.

For purposes of this invention, the term "hypertext" includes both the simple hypertext model shown in FIG. 3 and the nested hypertext model shown in FIG. 4. Those skilled in the art will appreciate that the simple hypertext model can be one selector switch corresponding to a request to display the next page on the stack, and one selector switch corresponding to a request to display the previous page on the stack, and still fall within the spirit and scope of this invention.

Figure 5A:
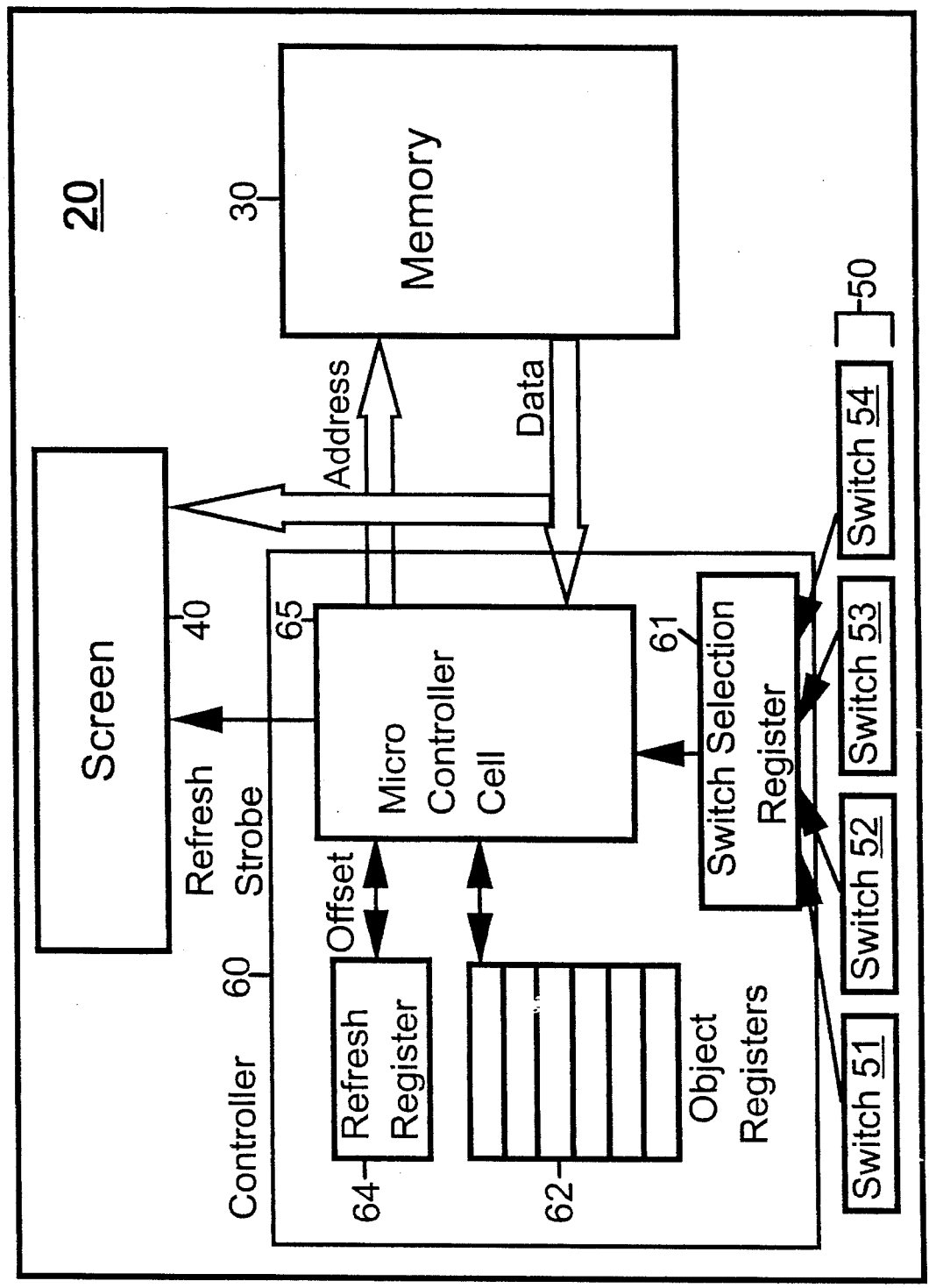
FIG. 5A shows a block diagram of the information retrieval device of the preferred embodiment of the invention.

FIG. 5A shows a block diagram of information retrieval device 20 of the preferred embodiment. As previously discussed, device 20 contains non-volatile memory 30, display screen 40, and input selection switches 50. Device 20 also contains controller 60 which is connected to everything just discussed. In the preferred embodiment, controller 60 is not a general purpose microprocessor such as an Intel 8088, although such a processor could be suitably programmed as discussed herein and used in an alternate embodiment of the invention. In order to save money and space and eliminate unnecessary circuitry, controller 60 contains selection switch register 61, object registers 62, refresh register 64, and microcontroller 65. In the preferred embodiment, microcontroller 65 is a Intel 8051 microcontroller cell, although other controller cells or equivalent circuitry could be used.

Figure 5B:
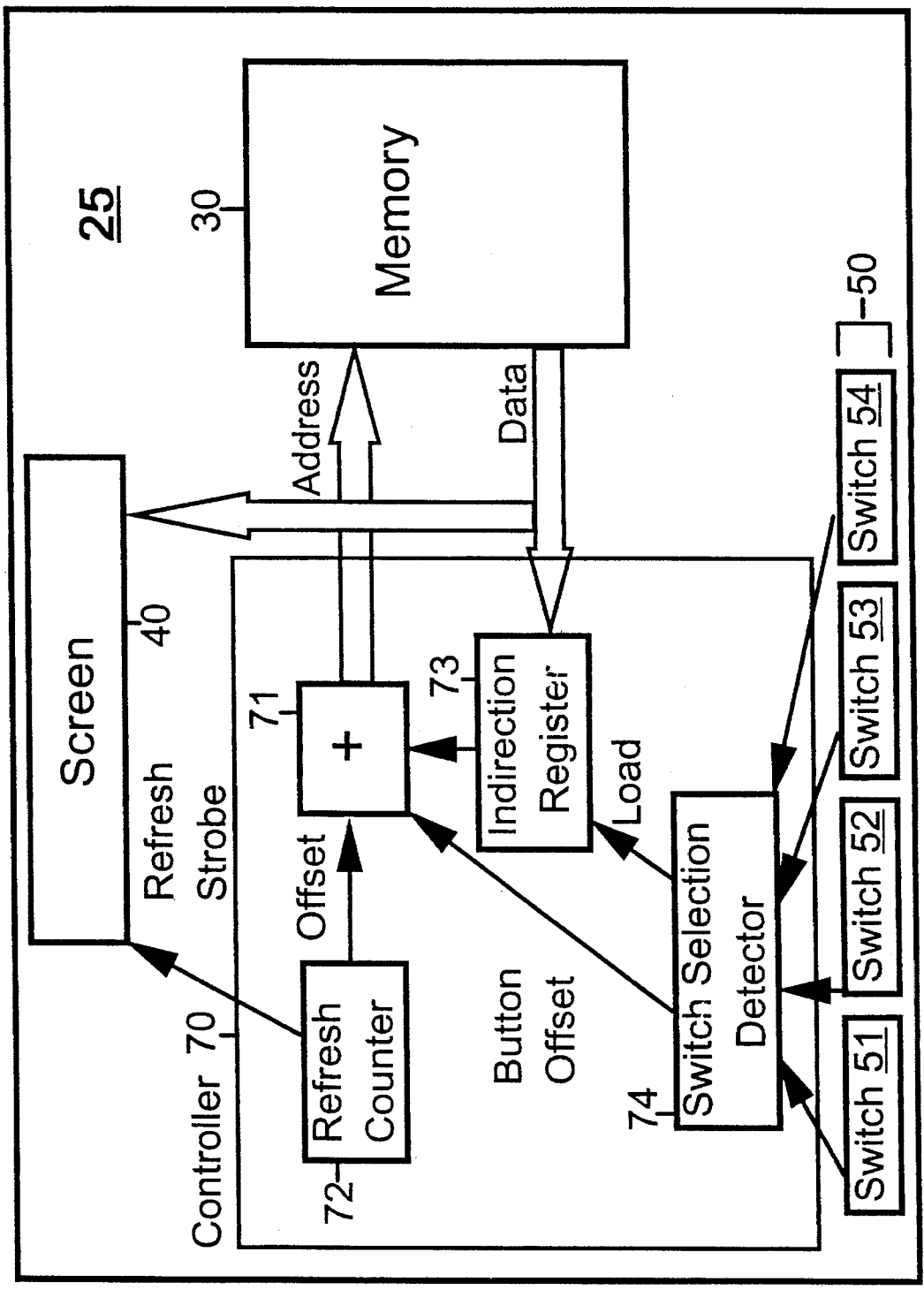
FIG. 5B shows a block diagram of the information retrieval device of an alternate embodiment of the invention.

FIG. 5B shows a block diagram of information retrieval device 25 of a first alternate embodiment of the invention. FIG. 5B is the same as FIG. 5A, except that controller 60 has been replaced by controller 70. Controller 70 contains adder 71 connected to refresh counter 72, indirection register 73, and switch selection detector 74. While device 25 supports the simple hypertext model shown in FIG. 3 at a lower cost than device 20 of the preferred embodiment, it cannot support the nested hypertext model shown in FIG. 4. Device 25 uses indirection register 73 to point to hypertext pages referenced by the selection of switches 50. These pages could be displayed sequentially in response to the selection of a "next page" or "previous page" switch, or can display pages uniquely assigned to specific switches selected as a specific page is displayed.

Figure 6A:
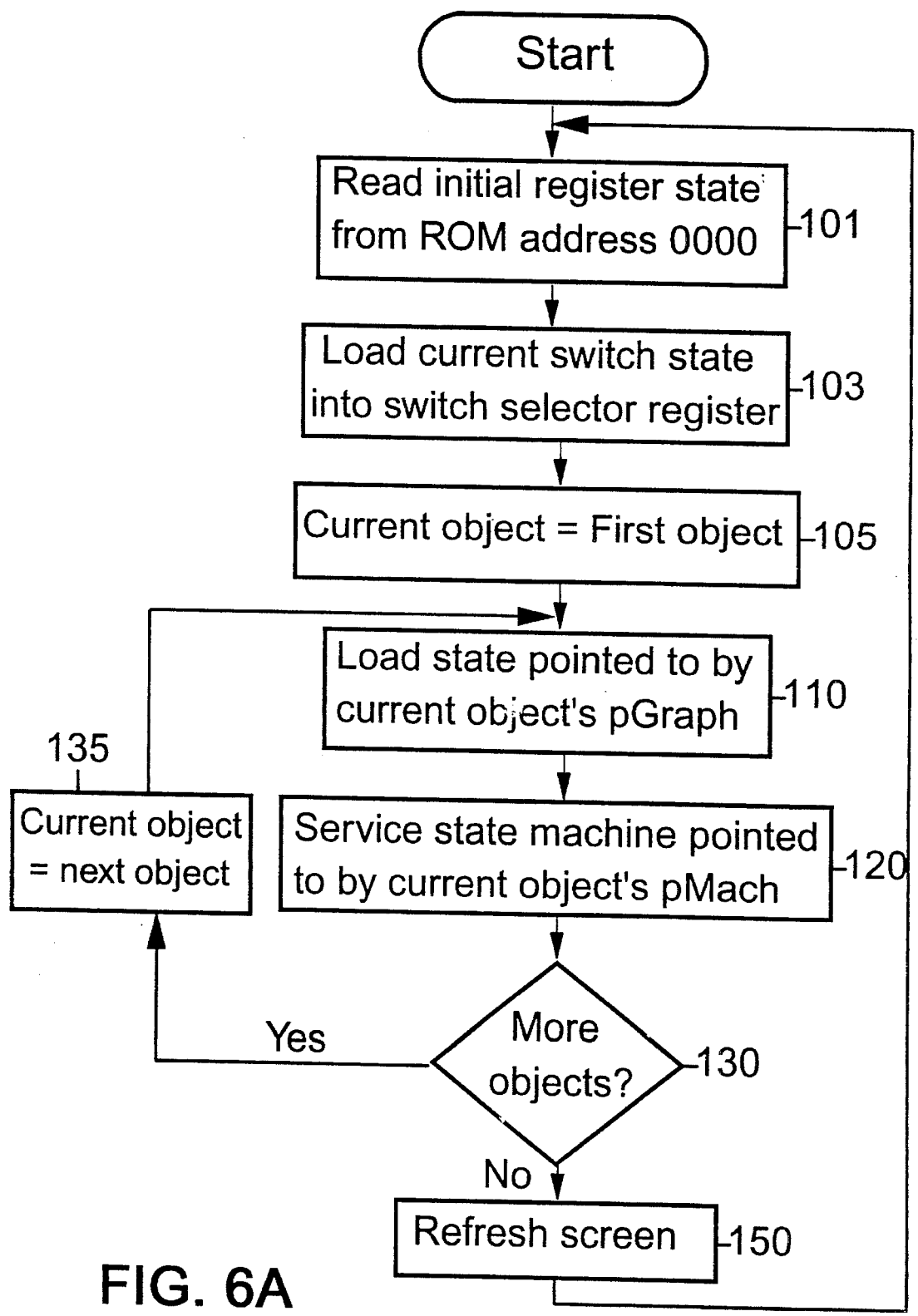
FIG. 6A shows a flowchart of the operation of the controller in the information retrieval device of the preferred embodiment of the invention.

The operation of information retrieval devices 20 and 25 of FIG. 5A and FIG. 5B will now be discussed by referring to FIGS. 6A–7A and 6B–7B. FIG. 6A shows a flowchart of the operation of controller 60 in information retrieval device 20 of the invention. Controller 60 reads the initial state data from a first addressable area in non-volatile memory 30 in block 101. This initial state data contains the position and size of the displayed page and any nested pages. This initial state data also contains pointers to and initial states of one or more state machines contained in one or more other addressable areas in non-volatile memory 30. Also contained in the initial state data are one or more pointers to other addressable areas of non-volatile memory 30 containing images (text and/or graphics) pre-rendered for display on display screen 40.

In the preferred embodiment, this initial state data is contained at memory address 0000. Block 103 loads the initial state of input selector switches into selector switch register 61. Block 105 sets the current object equal to the first object (i.e. first stack in a nested hypertext model, or the only stack in a simple hypertext model).

Block 110 loads the current display state for this object into a register in object registers 62. Block 120 services the state machine for this object. As previously discussed, this state machine is located in a second addressable area in memory 30.

Block 130 checks to see if there are more objects with state machines to service. If so, block 130 is answered affirmatively, and block 135 sets the current object equal to the next object. Flow of control loops back to block 110. Once all objects have been serviced, block 150 refreshes the screen. Since all images displayed on display screen 40 are stored pre-rendered in non-volatile memory 30, block 150 refreshes display screen 40 directly from addressing non-volatile memory 30. Refresh register 64 keeps track of the area of the screen currently being refreshed, and microcontroller 65 directs memory 30 to send this data to screen 40. Note that unlike the general purpose computer of FIG. 1, no processor is required to render the data to video RAM for refresh and display to the display screen. After display screen 40 has been refreshed, flow of control returns to block 103.

Figure 6B:
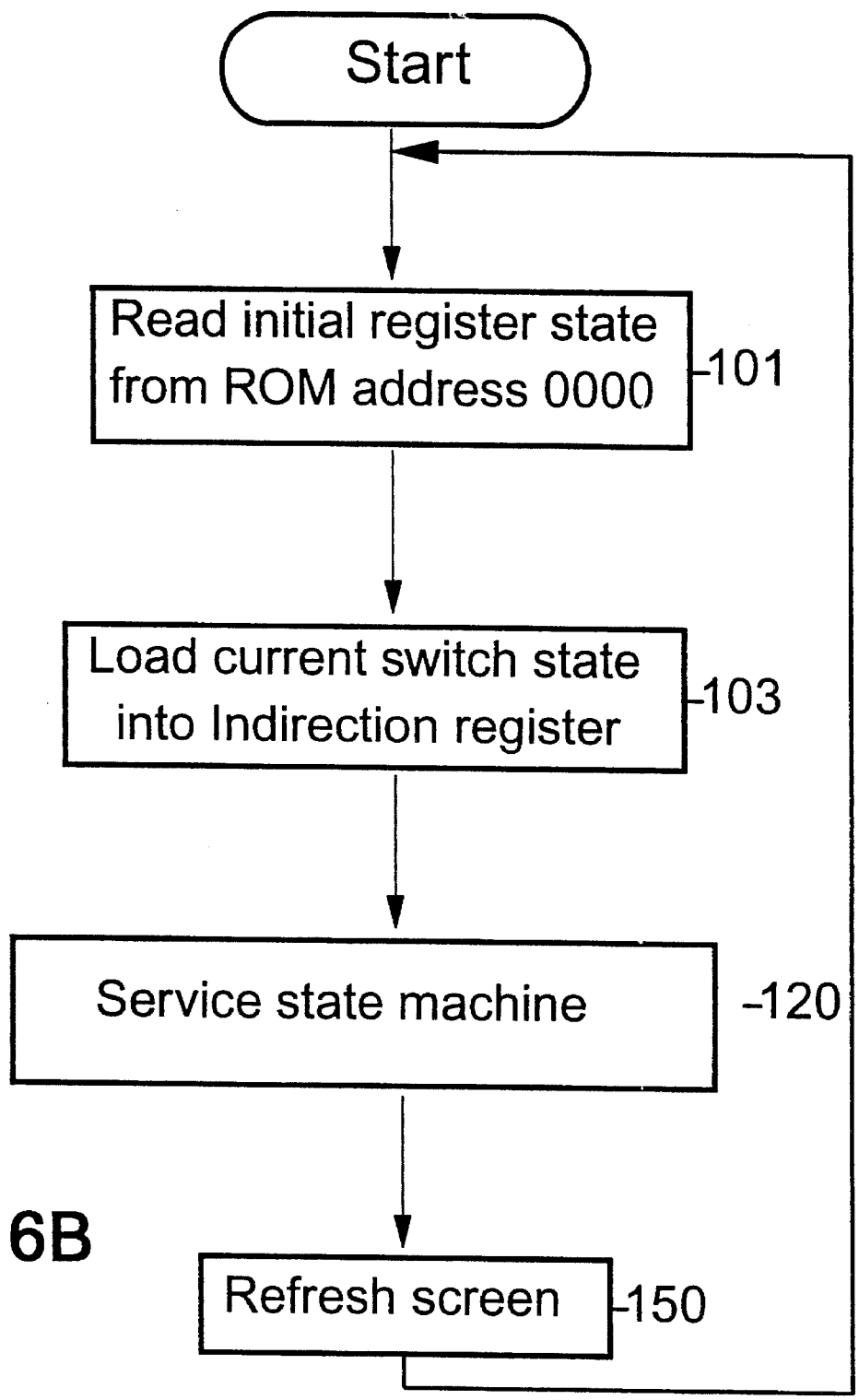
FIG. 6B shows a flowchart of the operation of the controller in the information retrieval device of an alternate embodiment of the invention.

FIG. 6B shows the flowchart describing the operation of device 25 of the first alternate embodiment. Note that it has much in common with the flowchart of FIG. 6A, except that block 103 would load the current switch states into indirection register 73. In addition, blocks 105, 110, 130, and 135 would be unnecessary, and block 120 services the single state machine of the alternate embodiment.

Figure 7A:
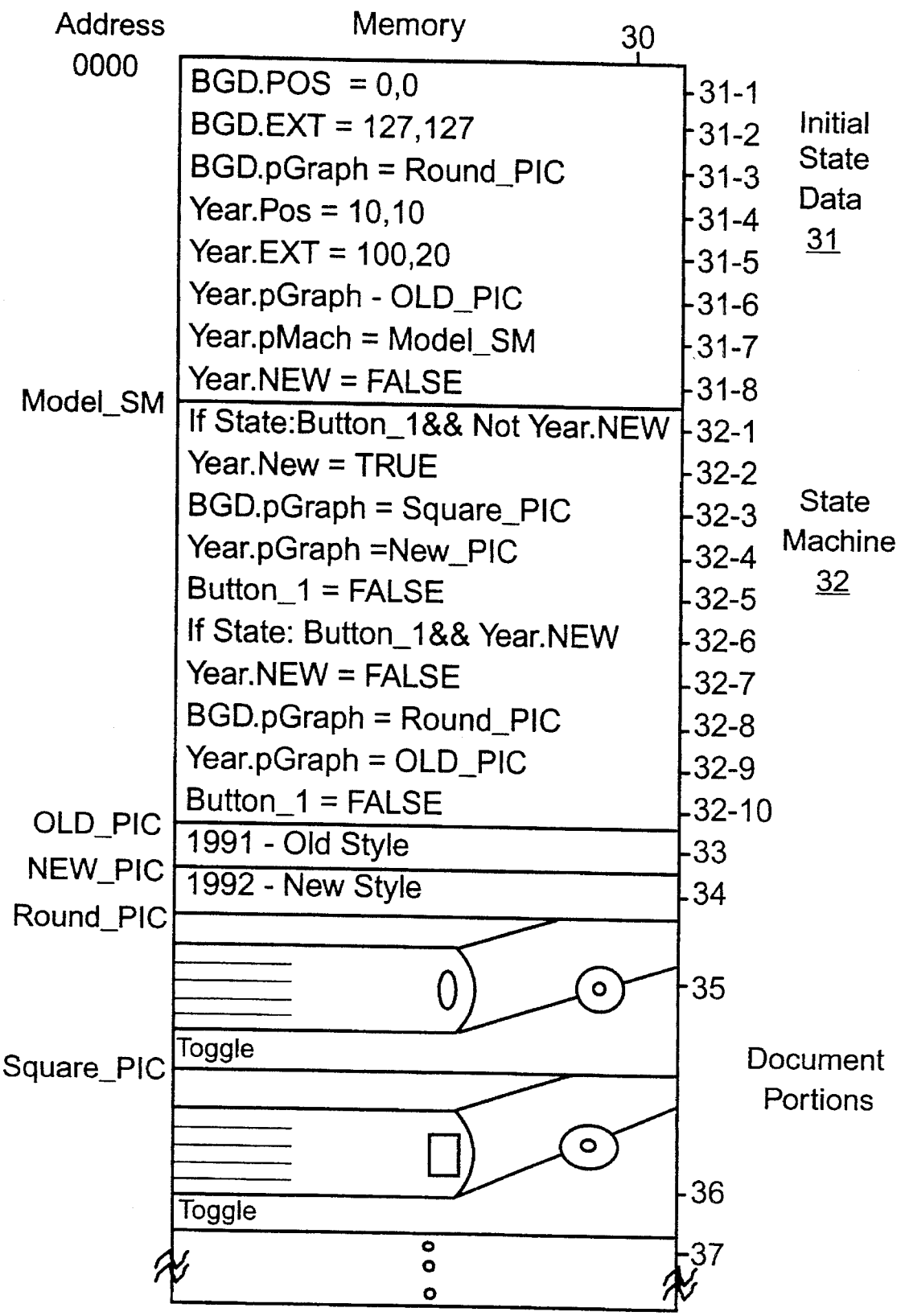
FIG. 7A shows a high level view of how a simple exemplary document is stored in the nonvolatile memory for use by the information retrieval device of the preferred embodiment of the invention.

FIG. 7A shows a simple example of how a document is stored on non-volatile memory 30 for use by information retrieval device 20. In this example, the document is a repair manual for an automobile. For purposes of illustration, we will assume that the entire manual is concerned with the repair of headlights of a particular model of car, although in practice the manual is likely to be much more extensive than this.

Initial state data 31 begins at address 0000 of memory 30. Line 31—1 defines the upper left hand corner of the background page to be coordinates 0,0, the upper left corner of display screen 40. Line 31-2 defines the size of the background image as 127, 127—the size of display screen 40 in the preferred embodiment. Of course, those skilled in the art will realize that display screen 40 could be much larger or smaller. Line 31-3 points to the location in memory 30 that stores the pre-rendered image of the background page to be displayed as device 20 is turned on. In our example, this address is ROUND_PIC, the beginning address of document portion 35.

Line 31-4 defines the upper left hand corner of a nested foreground page to be coordinates 10,10 on display screen 40. Line 31-5 defines the size of the foreground page as 100,20. Line 31-6 points to the location in memory 30 that stores the pre-rendered image of the foreground page to be displayed as device 20 is turned on. In our example, this address is OLD_PIC, the beginning address of document portion 33.

Line 31-7 points to the state machine for this example. Note that one state machine is sufficient to control both the background object and the foreground object in this example, since they both are affected the same way by the same events. This state machine has an address of MODEL_SM, the beginning address for state machine 32. Line 31-8 contains the initial state of the state machine.

State machine 32 contains the conditions of each state in the machine. Lines 32-1 to 32-5 define the conditions for the first state of state machine 32. In this state, the first button (switch 51) has been pressed (detected by checking switch selection register 61 for the current button status), and YEAR.NEW is FALSE. This is the state that is entered in our example when device 20 has just turned on, is displaying the initial images as discussed above and shown in FIG. 2, and button 51 is pressed. By pressing button 51, the user wants to toggle to see the new style of headlight. The first state sets YEAR.NEW to be TRUE, and points to SQUARE_PIC as the background page to be displayed, and NEW_PIC as the foreground page to be displayed. Line 32-5 also resets Button_1 to FALSE. When block 120 detects that the state of the state machine it is servicing has changed, it updates the images displayed and refreshed on display 40.

State machine 40 remains in this state until button 51 is pressed again. When that occurs, controller 60 executes the second state of state machine 32, designated by lines 32-6-32-10. By pressing button 51, the user wants to toggle back to see the old style of headlight. The second state sets YEAR.NEW to be FALSE, and points to ROUND_PIC as the background page to be displayed, and OLD_PIC as the foreground page to be displayed. Line 32-10 also resets Button_1 to FALSE. When block 120 detects that the state of the state machine it is servicing has changed, it updates the images displayed and refreshed on display 40.

Figure 7B:
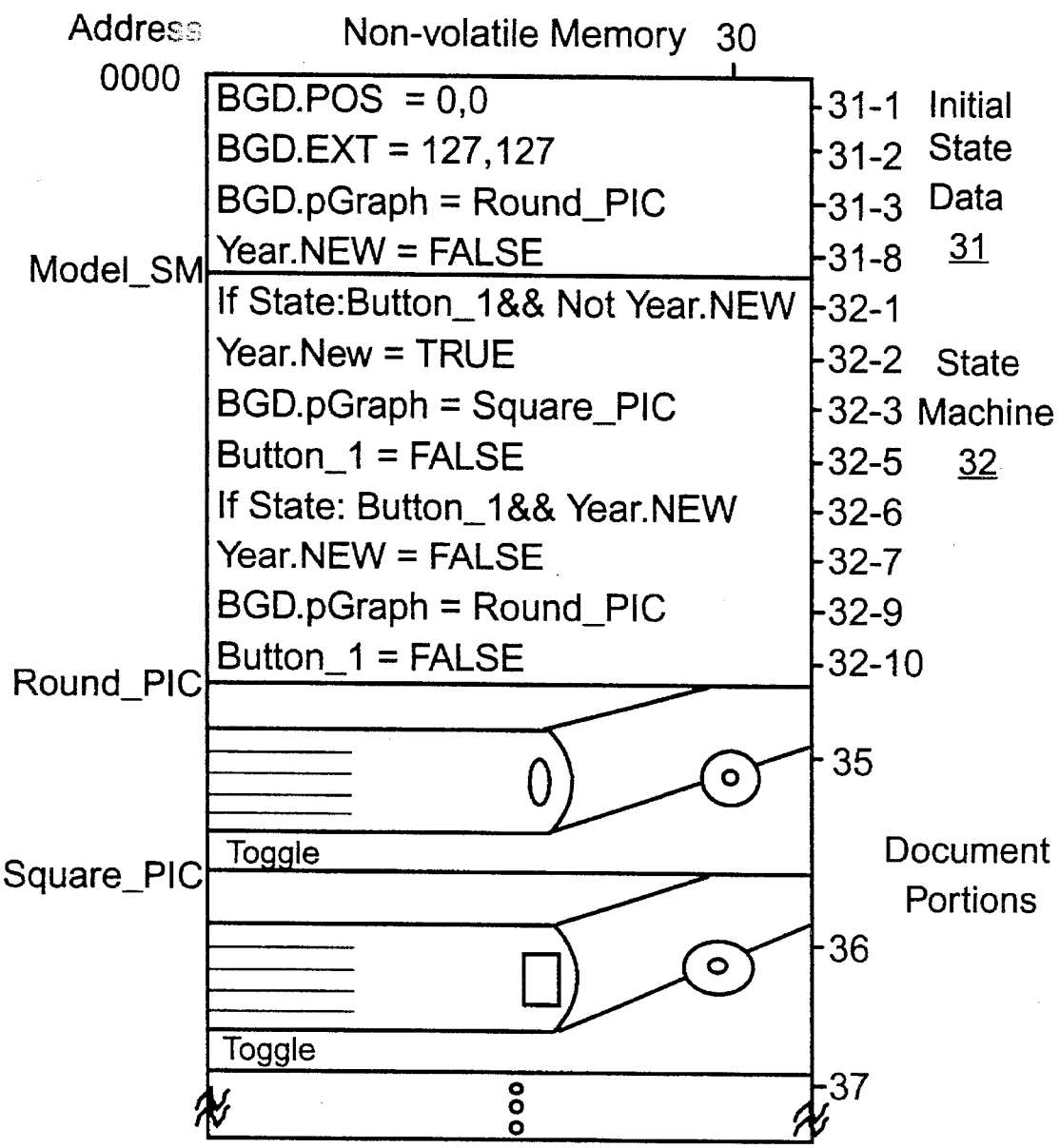
FIG. 7B shows a high level view of how a simple exemplary document is stored in the nonvolatile memory for use by the information retrieval device of an alternate embodiment of the invention.

FIG. 7B shows how the document of FIG. 7A is modified for use by information retrieval device 25 of the alternate embodiment. Note that FIG. 7B is very similar to FIG. 7A, except that document portions 33 and 34 and lines 31-4, 31-5, 31-6, 32-4 and 32-9 are not present, since device 25 does not support nested hypertext.

While this invention has been described with respect to the preferred and alternate embodiments, it will be understood by those skilled in the art that various changes in detail may be made therein without departing from the spirit, scope and teaching of the invention. For example, the circuits shown in the drawings could be replaced by other equivalent circuit structures. Accordingly, the herein disclosed is to be limited only as specified in the following claims.

What is claimed is:

1. An information retrieval device for displaying a document, comprising:

non-volatile memory for storing said document;

a plurality of input selector switches;

a display screen;

controller circuitry connected to said non-volatile memory, said input selector switches, and said display screen, said controller circuitry determining which portion of said document to display on said display screen, responsive to said plurality of input selector switches; and said controller circuitry refreshing said display screen directly from said non-volatile memory.

2. The device of claim 1, wherein said non-volatile memory is removable read only memory.

3. The device of claim 1, wherein said non-volatile memory is non-removable read only memory.

4. The device of claim 1, wherein said non-volatile memory is flash memory.

5. The device of claim 4, wherein the size of said device complies with the PCMCIA standard.

6. The device of claim 1, wherein said plurality of input selector switches are displayed on said display screen and selected by a mouse.

7. The device of claim 1, wherein said plurality of input selector switches are displayed on said display screen and selected by a stylus.

8. The device of claim 1, wherein said plurality of input selector switches are displayed on said display screen and selected by touch, said display screen being a touch display screen.

9. The device of claim 1, wherein said plurality of input selector switches are buttons.

10. An information retrieval device for displaying a document, comprising:

non-volatile memory for storing said document;

a plurality of input selector switches;

a display screen;

controller circuitry connected to said non-volatile memory, said input selector switches, and said display screen, said controller circuitry determining which portion of said document to display on said display screen, responsive to said plurality of input selector switches;

said controller circuitry refreshing said display screen directly from said non-volatile memory, said controller circuitry further comprising;

a microcontroller cell;

an object register for storing a plurality of hypertext object states; and a switch selection register for storing a current switch status.

11. The device of claim 1, said controller circuitry further comprising:

an adder; and an indirection register for pointing to hypertext pages referenced by said plurality of input selector switches.

12. An information retrieval device for displaying a document, comprising:

non-volatile memory for storing said document;

a display for displaying said document; and means for refreshing said display directly from said non-volatile memory.

13. The information retrieval device of claim 12, wherein said non-volatile memory stores said hypertext document as initial state data, a state machine, and a plurality of document portions.

14. A method for generating and displaying a document on a display screen, comprising the steps of:

reading initial state data from non-volatile memory;

determining a first display state from said initial state data;

displaying on said display screen a first portion of said document from a first document portion of said non-volatile memory corresponding to said first display state; and refreshing said display screen directly from said non-volatile memory.

15. The method of claim 14, further comprising the steps of:

monitoring a plurality of input selector switches;

responsive to said monitoring step, detecting that an input selector switch has been enabled;

responsive to said detecting step, changing from said first display state to a second display state; and responsive to said changing step, displaying on said display screen a second portion of said document from a second document portion of said non-volatile memory corresponding to said second display state.

16. A non-volatile memory for storing a document used by an information retrieval device, said non-volatile memory pluggable into said information retrieval device, said memory comprising:

a first section addressable by said information retrieval device, said first section comprising initial state data;

a second section addressable by said information retrieval device, said second section comprising said state machine;

a third section addressable by said information retrieval device, said third section comprising a first portion of said document;

a fourth section addressable by said information retrieval device, said fourth section comprising a second portion of said document;

said first section also comprising a pointer to said state machine;

said first section also comprising a pointer to said first portion of said document;

said state machine comprising a pointer to said first portion of said document for display by said information retrieval device when in a first display state; and said state machine also comprising a pointer to said second portion of said document for display by said information retrieval device when in a second display state.

17. A method of storing a document on a non-volatile memory used by an information retrieval device, said non-volatile memory pluggable into said information retrieval device, said method comprising:

generating and storing a first section addressable by said information retrieval device, said first section comprising initial state data;

generating and storing a second section addressable by said information retrieval device, said second section comprising said state machine;

generating and storing a third section addressable by said information retrieval device, said third section comprising a first portion of said document;

generating and storing a fourth section addressable by said information retrieval device, said fourth section comprising a second portion of said document;

generating and storing in said first section a pointer to said state machine;

generating and storing in said first section a pointer to said first portion of said document;

generating and storing in said state machine a pointer to said first portion of said document for display by said information retrieval device when in a first display state; and generating and storing in said state machine a pointer to said second portion of said document for display by said information retrieval device when in a second display state.

* * * * *